March 18, 1941.   S. MILLER   2,235,382
SWITCH HOUSING
Filed March 31, 1938
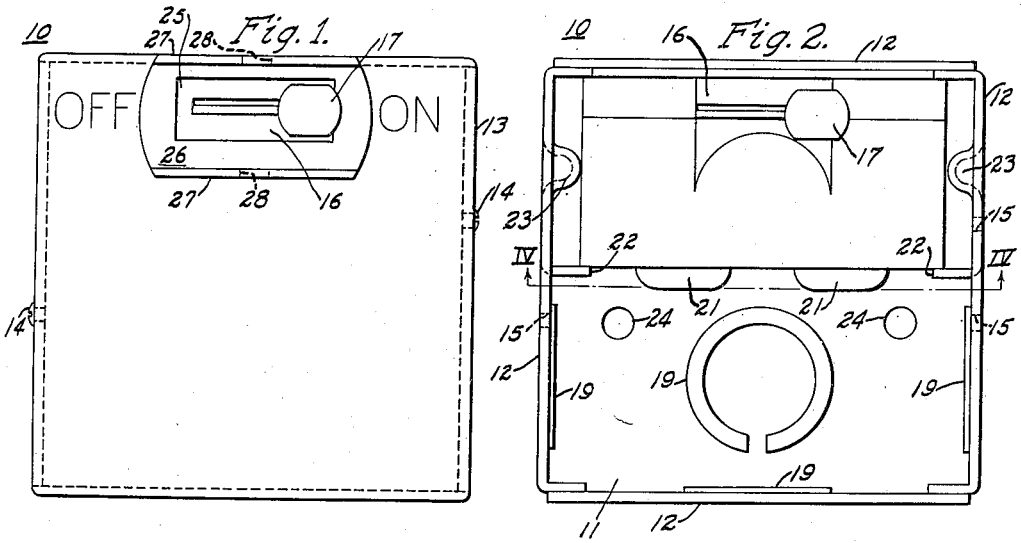
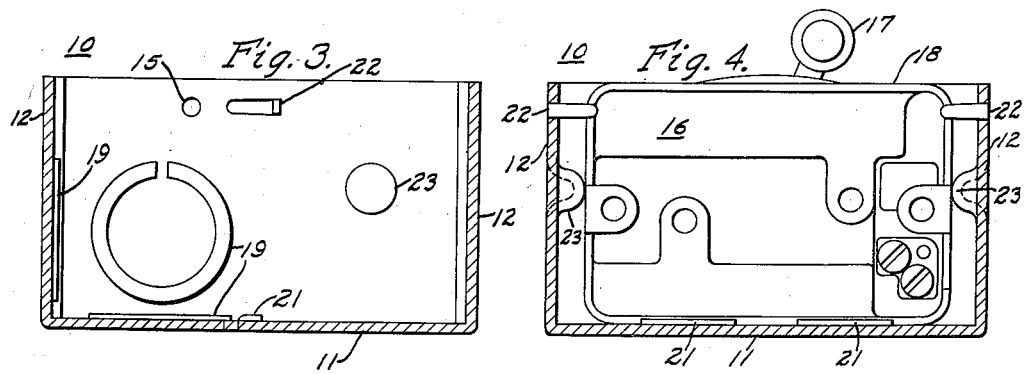
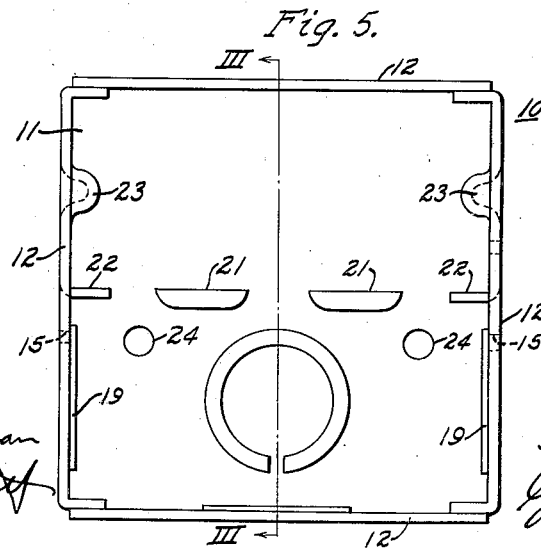
WITNESSES:
Leon M. Harman
[signature]
INVENTOR
Stephan Miller.
BY
[signature]
ATTORNEY Patented Mar. 18, 1941

2,235,382

UNITED STATES PATENT OFFICE 2,235,382

SWITCH HOUSING

Stephan Miller, Wilkinsburg, Pa., assignor to Westinghouse Electric & Manufacturing Company, East Pittsburgh, Pa., a corporation of Pennsylvania Application March 31, 1938, Serial No. 199,153

6 Claims. (Cl. 200—168)

My invention relates, generally, to boxes or housings and more particularly, to housings for enclosing electric switches and automatic circuit breakers.

For certain applications, it is desirable to enclose electrical apparatus, such as electric switches and automatic circuit breakers, in metal housings or cabinets which may be installed on the walls of buildings or on panels provided for supporting the electrical apparatus. Previous boxes or housings, with which I am familiar, have been so constructed that it is difficult to make the necessary wiring connections and install the switch or breaker unit in the housing.

An object of my invention, generally stated, is to provide a housing for electric switches which shall be easy to install and which may be economically manufactured.

A more specific object of my invention is to provide a housing in which an electric switch unit is held in position without requiring mounting screws or other separate devices.

Another object of my invention is to provide a housing having means formed integrally therewith for retaining an electric switch unit in position in the housing.

Other objects of the invention will be explained fully hereinafter or will be apparent to those skilled in the art.

According to one embodiment of the invention, an apparatus unit, such as an electric switch or automatic circuit breaker, is held in position in a metal box or housing by a number of inwardly extending projections which are formed integrally with the box and so disposed that the apparatus unit is positioned at one side of the box, thereby providing space at the other side for conduits and wires.

For a fuller understanding of the nature and objects of the invention, reference may be had to the following detailed description, taken in conjunction with the accompanying drawing, in which:

Figure 1 is a view, in plan, of a metal housing constructed according to my invention with an automatic circuit breaker unit in the housing;

Fig. 2 is also a view, in plan, of the housing shown in Fig. 1, the cover being removed to show the position of the breaker unit in the housing;

Fig. 3 is a view, in section, taken along the line III—III of Fig. 5;

Fig. 4 is a view, in section, taken along the line IV—IV of Fig. 2, and

Fig. 5 is a view, in plan, similar to Fig. 2, the breaker unit being removed from the housing.

Referring now to the drawing, the housing shown therein may preferably be composed of sheet metal and comprises a box 10 of a rectangular shape with a bottom wall 11, four side walls 12 and a removable cover 13 that is held on the box by a pair of screws 14 which may be inserted into tapped holes 15 in the sides of the box. The box may be formed by cutting and stamping a piece of sheet metal of the desired size and shape, folding the sides together and tack welding them, at the corners. The cover 13 may also be formed from a single piece of sheet metal.

An electric switch or automatic circuit breaker unit 16, having an operating handle 17 is disposed inside of the housing, as shown in Figs. 2 and 4. The breaker unit may be of a well known type having its operating mechanism enclosed in a case 18, thereby permitting the complete breaker unit to be removed from the housing 10.

In order to facilitate the installing of the breaker unit 16 in the housing and the making of the necessary wiring connections, provision is made for holding the breaker unit in that portion of the housing which is opposite the usual knockout devices 19 provided in the walls of the housing for the entrance of wiring cables or conduits. Thus, sufficient space is available in the housing for the entrance of the wires which are to be connected to the breaker unit.

The breaker unit is held in position at one side of the housing by a pair of inwardly extending projections 21, which are formed integrally with the bottom wall 11, and a pair of oppositely disposed ears 22, which are bent inwardly from the side walls 12. As shown, the projections 21 and the ears 22 are disposed in alinement to engage one side of the breaker unit. In addition to the projections 21 and the ears 22, a pair of oppositely disposed rounded projections 23, which may be pressed inwardly from the side walls 12, are provided for engaging the ends of the breaker unit to maintain the necessary clearance between the terminals of the breaker and the side walls for insulation purposes and to locate the breaker properly in the housing.

When installing the apparatus, the housing may be secured to a building wall or a panel by means of screws, which may be inserted through holes 24 provided in the bottom wall 11 of the housing. The wires may then be brought into the housing through one of the knockouts 19 and the proper connections made to the breaker unit. After the wiring connections are made, the breaker unit may be slipped into position between the projections 23, where it is held by the bottom projections 21 and the ears 22. The cover 13 may then be fastened on the housing by means of the screws 14 to retain the breaker unit in the housing.

As shown in Fig. 1, a rectangular opening 25 is provided in the cover 13 for the handle 17 of the breaker. A guard plate 26 having raised sides 27 for protecting the breaker handle 17 is provided on top of the cover 13. The words "Off" and "On" may be stamped on the cover as shown to indicate the position of the switch mechanism. The handle 17 may be locked in either position by inserting a lock through holes 28 provided in the sides 27 of the guard plate 26.

From the foregoing description, it is apparent that I have provided a switch housing which may be economically manufactured, as a minimum number of operations are required to form the box. Furthermore, the switch unit may be easily installed in the housing, since no mounting screws or devices other than those formed integrally with the box are required for holding the switch unit in position in the housing, thereby considerably reducing the time required to install each unit.

I do not desire to be restricted to the specific embodiment of my invention herein shown and described, since it is evident that it may be changed and modified without departing from the spirit and scope of my invention as defined in the appended claims.

I claim as my invention:

1. A housing for a rectangular switch unit comprising a rectangular box having integral bottom and side walls, said bottom and side walls having inwardly extending projections formed integrally therewith to engage one side of the switch unit for holding the switch unit in a predetermined position at one side of the box, a removable cover for retaining the switch unit in the box, and means for securing the cover on the box.

2. A housing for a rectangular switch unit comprising a rectangular box having integral bottom and side walls, said bottom and side walls having inwardly extending projections formed integrally therewith to engage one side of the switch unit for holding the switch unit in position at one side of the box, a plurality of knockout devices disposed in the walls for entrance to the other portion of the box not occupied by the switch unit, and a cover for retaining the switch unit in the box.

3. A housing for a rectangular switch unit comprising a rectangular box having integral bottom and side walls, said bottom wall having inwardly extending projections formed integrally therewith for engaging the edge of one side of the switch unit, said side walls having oppositely disposed inwardly extending projections formed integrally therewith for engaging the side of the switch unit to hold it in position at one side of the box, and a cover for retaining the switch unit in the box.

4. A housing for a rectangular switch unit comprising a rectangular box having integral bottom and side walls, said bottom wall having inwardly extending projections formed integrally therewith for engaging the edge of one side of the switch unit, said side walls having oppositely disposed inwardly extending projections formed integrally therewith in alinement with the projections on the bottom wall for engaging the side of the switch unit to hold it in position at one side of the box, additional projections formed integrally with the side walls for engaging opposite ends of the switch unit, and a cover for retaining the switch unit in the box.

5. A housing for a rectangular switch unit comprising a rectangular box having integral bottom and side walls, said bottom wall having inwardly extending projections formed integrally therewith for engaging the edge of one side of the switch unit, said side walls having oppositely disposed inwardly extending projections formed integrally therewith in alinement with the projections on the bottom wall for engaging the side of the switch unit to hold it in position at one side of the box, additional projections formed integrally with the side walls and having rounded surfaces for engaging opposite ends of the switch unit, and a cover for retaining the switch unit in the box, said cover having an opening therein for the switch handle.

6. A housing for a rectangular switch unit comprising a one-piece rectangular metal box, inwardly extending projections formed integrally with the walls of the box for engaging one side of the switch unit to hold the switch unit in position at one side of the box thereby providing space for standard size knock-outs in the portion of the box not occupied by the switch unit, and a cover for retaining the switch unit in the box.

STEPHAN MILLER.